3,193,446
LATEX BONDED ASBESTOS FIBER SHEET
MATERIAL
Bernard J. Eisenberg, Naugatuck, Conn., assignor to
United States Rubber Company, New York, N.Y.,
a corporation of New Jersey
No Drawing. Filed Nov. 26, 1962, Ser. No. 240,148
6 Claims. (Cl. 162—145)

This invention relates to an improved process for the preparation of beater saturated fiber sheet materials in which a portion or all of the fiber material is asbestos. The invention is more particularly related to the preparation of water-laid fiber sheets wherein the individual fibers are coated with a deposit of a synthetic rubber while the fibers are in an aqueous suspension. The particular improvement of this invention is directed to the use of high molecular weight polymers containing carboxyl or functionally equivalent groups as a constituent of the latex system for controlling the precipitation of the synthetic rubber onto the fibers.

The prior art teaches that the addition of a synthetic rubber latex to asbestos fiber slurries normally results in the immediate coagulation of the rubber in the synthetic latex. This immediate coagulation of the rubber results in a severe clotting of the fibers, which results in the material being entirely unsuitable for the manufacture of sheet materials. The finished sheet materials being characterized by poor distribution of the rubber binders and of low physical strength.

The premature coagulation of the latex has been attributed to the presence of metallic ions in the water slurry of fibers. When asbestos is circulated in a water slurry, it is believed that magnesium ions are released from the asbestos fibers and that minor portions of iron and aluminum ions are also released. It is further thought that these ions are present in sufficient quantity to affect the stability of the latices upon addition of the latex to the asbestos fibers.

Prior art processes have sought to solve the problem of premature coagulation by the addition of chelating or sequestering agents, e.g., sodium citrate, to the slurry before the latex addition. The chelating or sequestering agent serves to tie up the free ions and allows the latex to be deposited uniformly on the fibers.

The use of the present carboxylated latices offers a number of advantages over chelating or sequestering agents in the control of latex precipitation. The latices of the present invention eliminate the need for chelating or other stabilizing agents and the cost of such agents. The present latices also become part of the finished product as distinguished from chelating agents which remain in solution and do not become part of the finished product but do add to the cost of finished product.

In the present process the need for separate addition of chelating or sequestering agents is eliminated. The carboxylated polymers utilized in my invention avoid premature coagulation of the latex without causing the disadvantages attributable to the prior art chelating or sequestering agents.

The present invention is also applicable to processes employing mixtures of asbestos fibers and organic cellulosic fibers, such as kraft, where the presence of asbestos fibers causes premature coagulation upon addition of synthetic rubber latex.

It is an object of my invention to provide an improved process for the preparation of water-laid rubber bonded sheet material from asbestos fibers and mixtures of asbestos fibers with other fibers.

It is a further object of my invention to provide an improved process for the preparation of water-laid rubber bonded sheets from asbestos fibers and mixtures of asbestos fibers with other fibers in which the premature coagulation of the latex is controlled by the use of a carboxylated latex and an improved rubber bonded sheet material produced by this process.

In general, the procedure for manufacturing rubber bonded fiber sheet products is as follows. The asbestos fibers are first placed in a beater with water and circulated therein for a period of time. The beater serves to break up the larger fiber bundles present, separates the fibers and may also decrease the size of the fibers when desired. The fiber bundles may also be broken down by other means such as a Jordon refiner. The stock is then transferred to a slurry tank where the latex is added and deposited onto the fibers. The latex may also be added to the beater, the stock chest or immediately before the fan pump of the paper machine. With the use of asbestos as the main source of fiber, the slurry tank is preferred for the latex addition. The slurry tank should be provided with adequate means to agitate the material in the tank. After the addition of the synthetic latex, the slurry of coated fibers is fed to conventional paper making equipment such as a Fourdrinier wire or cylinder machine where the slurry is de-watered and the sheet material is formed.

In the following description of this invention all percentages, proportions and material measurements are to be considered in terms of the weight of the materials unless otherwise specified.

In the present process the latex employed contains a minor portion of a high polymer latex containing carboxyl or functionally equivalent groups and a major portion of standard synthetic latex. The latex may also, but less preferably, contain, as the rubber component, only a high molecular weight polymer containing carboxyl or functionally equivalent groups. The rubbery polymer containing carboxyl or functionally equivalent groups may be any one of the following; a butadiene-styrene-itaconic acid terpolymer, for example, the terpolymer containing approximately 45 parts butadiene, 50 parts styrene and 1-5 parts itaconic acid; a latex polymer containing styrene, butadiene and methacrylic acid, for example, the terpolymer containing styrene, butadiene and methacrylic acid in the ratio of 63:35:2; and a latex polymer containing styrene, butadiene and methacrylamide, for example, the terpolymer containing the styrene, butadiene and methacrylamide in the ratio of 57:40:3. Other styrene-butadiene-polycarboxylic acid polymers, such as the terpolymer of styrene, butadiene and maleic acid may also be employed. The preferred latex containing a carboxyl or functionally equivalent groups is the butadiene-styrene-itaconic acid terpolymer latex. The polymer containing carboxyl or functionally equivalent groups will hereinafter be referred to as the carboxylated polymer. The standard latex may contain a rubbery copolymer of styrene and butadiene or of acrylonitrile and butadiene or may be a neoprene latex. All of the above latices may also contain emulsifiers, antioxidant and other modifiers and additives that are well known to those skilled in the art.

The amount of carboxylated latex needed to control the latex deposition will vary with the consistency of the fiber slurry and to a lesser extent with the size of the fiber structures. The size of the fiber structures in turn is dependent on the size of the original fiber and the refining time or degree of beating of the fiber. Increasing the fiber consistency or the refining time or degree of beating of the fibers will normally result in increasing the minimum required level of the carboxylated latex.

If the two latices of the above mentioned types are combined in the preferred proportions (when using fiber slurries at approximately 1.0 percent consistency) of 3.0–20% of the carboxylated polymer latex and 97–80% of the standard latex, no chemicals are needed to control the precipitation of the rubber or the size of the coated fiber structures or the rate of water removal during the sheeting step. As the proportion of the carboxylated polymer is increased, the size of the coated fiber structures decrease. If more than 20% of the carboxylated polymer is present in the mixture of latices with a fiber consistency of 1.0 percent, the mixture functions as if only the carboxylated polymer were present.

When working with higher fiber consistencies, such as 4.0 percent, I have found that the two latices, the carboxylated polymer latex and the non-carboxylated polymer latex, should be combined in the preferred proportion of 30% of the carboxylated polymer latex and 70% of the standard non-carboxylated latex. This carboxylated polymer level is the minimum amount required to prevent premature coagulation. Increasing the carboxylated latex level above 40% increases the time required for the latex to precipitate although there is little or no effect on the size of fiber structures.

The present invention also allows the size of the coated fiber structures to be regulated without the use of a precipitating agent, such as calcium chloride or aluminum sulfate. By controlling the ratio of carboxylated polymer latex to non-carboxylated polymer latex the size of the coated fiber structures may be controlled without the addition of a precipitating agent. The size of the coated fiber structures may be regulated without additional precipitating agent when there is less than 15% of carboxylated polymer in the system when employing a fiber slurry at 1% consistency. With a fiber slurry at 4.0% consistency, there is no appreciable advantage in adding a precipitating agent until the carboxylated polymer proportion exceeds 40%. At these high concentrations of the carboxylated polymer, the rate of deposition becomes slower so that a precipitating agent is desirable. A precipitating agent may be used, however, even in those instances where the carboxylated latex is present in less than the indicated quantities. If a precipitating agent is used, it may be added to the system either before or after latex addition. The precipitating agent should be added slowly and in dilute solutions to prevent rapid flocculation. The quantities of these agents that are added will depend on the type of coated fiber structures desired.

My invention may be more readily understood by reference to the following examples, which are given by way of illustration and not by limitation.

EXAMPLE I 800 grams of Asbestos 6D at 4% consistency in water were circulated in a Valley beater for 40 minutes. 510 grams of this slurry were transferred to a three liter beaker and diluted to 1% consistency. The resultant slurry was agitated at 120 r.p.m. wtih a Lightning mixer. A latex system comprising 5% of a butadiene-styrene itaconic acid rubbery terpolymer (48% solids) and 95% of a butadiene-styrene rubbery copolymer (49.2% solids) was added to the slurry in the amount of 15% by weight of the dry solids content, based on the fiber in the slurry, and agitated until the water phase became free of latex.

The slurry-latex mixture was then de-watered by introducing the mixture into conventional paper-making equipment. The bonded fiber sheet obtained by this process was similar in its physical characteristics, including uniformity of binder on the fiber, to a bonded fiber sheet produced by a process employing sodium citrate as a chelating agent, as described in Example II below. There was no preature coagulation of the latex system.

EXAMPLE II

An asbestos fiber slurry was prepared as in Example I. 0.38 gram of sodium citrate (dry powder) was added to the slurry at 1% consistency and the slurry was mixed for 10 minutes. A standard styrene-butadiene latex (49% solids) was added to the slurry in an amount of 15% by weight of solids, based on the weight of the fiber in the slurry. The latex slurry mixture was de-watered on conventional paper making equipment. On the resultant fiber sheet, the binder was uniformly deposited on the fiber.

EXAMPLES III–XI

The following table, Table I, shows the effect of various copolymers and terpolymer on the precipitating characteristics of asbestos fibers. The asbestos slurry employed in the examples of this table was prepared in the manner of Example I. The slurry contained 20.6 grams of dry fiber and was diluted to 1% consistency. The treated fiber slurry was deposited with conventional paper making equipment. The column titled "Structure" indicates the effectiveness of the particular latex system in controlling the latex-fiber deposition. The term "Standard" indicates that the latex-fiber system was deposited at such a rate that the latex was uniformly deposited on the fiber. The term "Clotting" indicates that there was premature coagulation of the latex and the resulting fiber sheet was not uniform. The term "Small" indicates that the latex bound fiber structures were fine and the time required for deposition was longer than in the case of "Standard." The terms "Clotting" and "Small" indicate extremes in latex deposition. A proportion of carboxylated latex to non-carboxylated between the relative proportions of Examples IV–V, VI–VII, VIII–IX, or X–XI would result in a latex system in which the deposition of latex could be controlled without the use of a chelating or sequestering agent.

Table I shows that approximately 15% total latex solids based on dry fiber, good fiber structures can be prepared by the beater saturation process without the addition of sequestering or chelating agents to control the latex depo-

*Table I*

| Example | A | B | C | D | E | F | Total dry grams | Structure |
|---|---|---|---|---|---|---|---|---|
| III | 0.240 | 2.95 | | | | | 3.19 | Standard. |
| IV | | 3.15 | | | | | 3.15 | Clotting. |
| V | 0.48 | | 2.74 | | | | 3.22 | Small. |
| VI | | | | 3.01 | | | 3.01 | Do. |
| VII | | 2.21 | | 0.926 | | | 3.13 | Clotting. |
| VIII | | 2.21 | | | 0.960 | | 3.17 | Standard. |
| IX | | | | | 3.12 | | 3.12 | Small. |
| X | | 2.21 | | | | 0.840 | 3.05 | Clotting. |
| XI | | 1.23 | | | | 1.68 | 2.91 | Small. |

Range—14.3%–16.7% dry latex on fiber.
Values in table represent dry grams of latex added.
Identification:
    A = A styrene-butadiene-itaconic acid terpolymer with the ingredients in the ratio 50/45/5.
    B = A styrene-butadiene copolymer with the ingredients in the ratio 50/50.
    C = A butadiene-acrylonitrile copolymer with the ingredients in the ratio 66/34.
    D = A styrene-butadiene-methacrylic acid terpolymer with the ingredients in the ratio 63/35/2.
    E = A styrene-butadiene-methacrylic acid terpolymer with the ingredients in the ratio 58/40/2.
    F = A styrene-butadiene-methacrylamide terpolymer with the ingredients in the ratio 57/40/3.

sition. Desirable latex coated fiber structures can be obtained by regulating the amount or quantity of carboxylated polymer so that sufficient carboxylated polymer is present to avoid clotting of the fibers and the carboxylated polymer is not present in excess so as to cause small fiber structures and slow draining of the latex coated fibers.

EXAMPLE XIII

An asbestos fiber slurry was prepared to 4.0% consistency as in Example I. To the slurry at 4.0% consistency was added a latex system composed of 30 parts of a styrene-butadiene-itaconic acid rubbery terpolymer (48.0% solids) and 70 parts of a styrene-butadiene rubbery copolymer (49.2% solids). The slurry-latex mixture was then de-watered as in Example I. There was no premature coagulation of the latex and the sheet material structure was uniform throughout.

EXAMPLE XIV

Unbleached kraft pulp was beaten in a Valley beater to 500 Canadian standard freeness. Asbestos fibers were separately prepared by circulating the fibers in a Valley beater at 4.0% consistency for forty minutes. Fifty dry parts of each fiber were mixed together and diluted to 1.0% consistency. To the mixed fibers was added a latex system composed of 92 parts of a standard styrene-butadiene latex (49.2% solids) and 8 parts of a carboxylated styrene-butadiene latex (48.0% solids) in an amount equal to 25% latex solids based on dry fiber. The latex solids were deposited with agitation. There was no premature coagulation of the latex and the latex was deposited uniformly on the asbestos fibers.

The product of the present invention may be used for the same purposes as a standard latex bonded fiber sheet, i.e., as backing material for floor coverings, gasket material, and in the manufacture of laminated products.

The finished product may also be post treated by embossing or may be coated with a resin such as a vinyl polymer. The product may also be cured to vulcanize the rubber.

Various other modifications in the process and uses of the product will be apparent to those skilled in the art.

Having thus described my invention, what I claim and desire to protect by Letters Patent is:

1. A method of making a latex bonded fiber sheet material comprising forming a water slurry of fibrous material at from 1 to 4% consistency, said fibrous material comprising, in equal parts by weight, organic cellulosic fibers and asbestos fibers which release metallic ions in water, adding a latex to said slurry, said latex comprising a mixture of about 97–70% by weight of a rubbery polymeric material selected from the group consisting of a butadiene-styrene copolymer and a butadiene-acrylonitrile copolymer, the remainder of said latex being composed of a carboxylated rubbery polymer selected from the group consisting of a butadiene-styrene-itaconic acid terpolymer, a butadiene-styrene-methacrylic acid terpolymer and a styrene-butadiene-methacrylamide terpolymer, said carboxylated rubbery polymer being present in the amount of from 3% by weight at a fiber consistency of 1% to 30% by weight at a fiber consistency of 4%, and de-watering the slurry-latex mixture to form bonded fiber sheet material.

2. In a process of producing a water-laid, latex bonded, fibrous sheet material from a water slurry of asbestos fibers which release metallic ions in water, the improvement which comprises controlling the deposition of the latex by employing a latex system comprising 97–70% by weight of a rubbery polymeric material selected from the group consisting of a butadiene-styrene copolymer and a butadiene-acrylonitrile copolymer and from 3–30% of a rubbery polymeric material selected from the group consisting of a butadiene-styrene-itaconic acid terpolymer, a butadiene-styrene-methacrylic acid terpolymer and a styrene-butadiene-methacrylamide terpolymer.

3. A method of making a latex bonded fiber sheet material comprising forming a water slurry of fibrous material, said fibrous material comprising, in equal parts by weight, organic cellulosic fibers and asbestos fibers which release metallic ions in water, adding a latex to said slurry, said latex comprising a mixture of about 97–70% by weight of a rubbery polymeric material selected from the group consisting of a butadiene-styrene copolymer and a butadiene-acrylonitrile copolymer, the remainder of said latex being composed of a rubbery polymer selected from the group consisting of a butadiene-styrene-itaconic acid terpolymer, a butadiene-styrene methacrylic acid terpolymer and a butadiene-styrene-methacrylamide terpolymer, and de-watering the lurrry latex mixture to form a bonded fiber sheet.

4. A method of making a latex bonded asbestos fiber sheet comprising the steps of forming a slurry of asbestos fibers in water, said asbestos fibers being the type that release metallic ions in water, adding a synthetic latex to said slurry, said latex comprising a mixture of about 97–70% of a styrene-butadiene latex and correspondingly about 3–30% of a styrene-butadiene-itaconic acid terpolymer latex, and de-watering the slurry-latex mixture to form a bonded fiber sheet.

5. A latex bonded fiber sheet material comprising asbestos fibers bonded with a latex, said asbestos fibers being the type that release metallic ions in water, said latex comprising a mixture of about 97–70% by weight of a rubbery polymeric material selected from the group consisting of butadiene-styrene copolymer, and butadiene-acrylonitrile copolymer and from 3–30% of rubbery polymeric material selected from the group consisting of a butadiene-styrene-itaconic acid terpolymer, butadiene-styrene-methacrylic acid terpolymer, and a styrene-butadiene-methacrylamide terpolymer.

6. A latex bonded fiber sheet material comprising asbestos fibers that release metallic ions in water and organic cellulosic fibers, in equal parts by weight, bonded with a latex, said latex comprising a mixture of about 97–70% of a rubbery polymeric material selected from the group consisting of butadiene-styrene copolymer and a butadiene-acrylonitrile copolymer and from 3–30% of a rubbery polymeric material selected from the group consisting of a butadiene-styrene itaconic acid terpolymer, a butadiene-styrene-methacrylic acid terpolymer and a styrene-butadiene-methacrylamide terpolymer.

References Cited by the Examiner

UNITED STATES PATENTS

| | | | |
|---|---|---|---|
| 2,614,093 | 10/52 | Wheelock. | |
| 2,772,970 | 12/56 | Feigley | 162—169 |
| 2,940,892 | 6/60 | Feigley et al. | 162—169 |
| 2,940,893 | 6/60 | Feigley | 162—169 |
| 2,944,044 | 7/60 | Baer. | |
| 3,026,217 | 3/62 | Hechtman et al. | 162—169 |

OTHER REFERENCES

Casey, "Pulp and Paper," vol. I, 1952, Interscience Pub., Inc., New York, N.Y., page 491.

DONALL H. SYLVESTER, *Primary Examiner.*

MORRIS O. WOLK, *Examiner.*